united States Patent [19]

Friderichs et al.

[11] 4,252,661

[45] Feb. 24, 1981

[54] HEAT STORAGE MEDIUM OF MOISTENED $NA_2HPO_4 \cdot 12H_2O$ AND METHOD OF A PREPARATION THEREOF

[76] Inventors: Peter Friderichs; Wiltraut Friderichs-Weinle, both of Sandstrasse 21, 6530 Bingen 12, Fed. Rep. of Germany

[21] Appl. No.: 964,285

[22] Filed: Nov. 28, 1978

[30] Foreign Application Priority Data

Dec. 1, 1977 [DE] Fed. Rep. of Germany ....... 2753598

[51] Int. Cl.$^3$ ............................. C09K 5/06; F24J 3/04
[52] U.S. Cl. ....................................... 252/70; 126/400
[58] Field of Search ........................... 252/70; 126/400

[56] References Cited

U.S. PATENT DOCUMENTS

| | | | |
|---|---|---|---|
| 2,333,862 | 11/1943 | Hill et al. | 126/400 X |
| 2,677,243 | 5/1954 | Telkes | 252/70 X |
| 2,677,367 | 5/1954 | Telkes | 252/70 X |
| 2,706,716 | 4/1955 | Howe et al. | 252/70 |
| 3,951,127 | 4/1976 | Watson et al. | 252/70 X |
| 4,117,882 | 10/1978 | Shurcliff | 126/400 X |

FOREIGN PATENT DOCUMENTS 50-90584 7/1975 Japan .......................... 252/70

*Primary Examiner*—Harris A. Pitlick
*Attorney, Agent, or Firm*—Frishauf, Holtz, Goodman & Woodward

[57] ABSTRACT

$Na_2HPO_4 \cdot 12H_2O$ is prevented from deteriorating as a heat storage medium after repeated cycles of heat storage and heat withdrawal resulting from precipitation of dehydrated forms of the salt by mixing thoroughly into the dodecahydrate material a small water content up to 5% of the mixture by weight, after which the material is heated above the melting point of the dodecahydrate and then cooled in a gas-tight container. Between 0.1 and 2% by weight of urea, and most preferably about 0.7% by weight thereof, may also be incorporated into the mixture, as by first dissolving the urea into the water to be added, in order to reduce the thermal expansion coefficient of the heat storage medium. Unlike disodium hydrogen phosphate dodecahydrate with stoichiometric hydration, the heat storage medium with the above-mentioned additions fully retains its phase reversibility after many heat cycles and makes available the highly suitable temperature of phase change and large magnitude of latent heat of the material for practical solar heating, heat pump, and air-conditioning systems.

10 Claims, No Drawings

HEAT STORAGE MEDIUM OF MOISTENED NA$_2$HPO$_4$.12H$_2$O AND METHOD OF A PREPARATION THEREOF

This invention concerns a latent energy storage medium of disodium hydrogen phosphate dodecahydrate base.

Latent energy storage media must fulfill the conditions of possessing a high specific latent heat, passing through a phase change in a suitable temperature region, and exhibiting this phase change reversibly for a long period of time.

By taking account of these criteria, various materials have been investigated with regard to their suitability as latent energy storage media. They have been tried out, for example, in house-heating equipment. Thus, for example, Na$_2$SO$_4$.10H$_2$O having a melting point of 32° C. and a heat of melting of 251 kJ/kg has been utilized for this purpose.

In the case of this latent heat storage medium, however, difficulties appeared in practice because the rate of energy absorption and delivery was reduced as the number of cycles increased and the heat capacity of the system was reduced by precipitation. An effort was accordingly made in order to prevent this precipitation of water-poor or water-free Na$_2$SO$_4$ with a strong and constant stirring of the heat storage material in the fluid state, and in some cases, for promoting thorough mixing, liquid paraffin or oil, or the like, was pumped through the heat storage liquid.

Eutectic mixtures, for example, composed of 45% urea and 55% ammonium nitrate, have also been described in technical literature and it has been observed in such cases that these are possibly suitable for storage of thermal energy. This urea-ammonium nitrate eutectic has a melting point of 46° C. and has a latent heat of merely 172 kJ/kg.

It is also known to utilize disodium hydrogen phosphate dodecahydrate as a latent energy storage medium. This material has a melting point of 35° C. that lies in a convenient temperature region and also has a very high latent heat, namely, 280 kJ/kg and would be outstandingly suitable as a latent energy storage medium on the basis of these properties. The disadvantage has been found, however, that this material becomes useless after a few cycles of phase change because water-free disodium hydrogen phosphate or else disodium hydrogen phosphate with less than 12 molecules of water of crystallization per phosphate molecule, especially the heptahydrate, precipitates and water separates out on the top. When this happens, the energy storage process is no longer reversible and the material in time becomes useless as a latent energy storage medium.

In the effort to prevent precipitation of disodium hydrogen phosphate heptahydrate, it was proposed in accordance with U.S. Pat. No. 2,677,367, in order to promote crystallization, that glass having an irregular surface be added to the dodecahydrate that can be produced as desired from water-free Na$_2$NPO$_4$ and water. Operation with solid glass bodies is extremely inconvenient and space consuming without giving any great assurance that the desired results are obtainable over a long period of time.

THE PRESENT INVENTION

It is an object of the present invention to prevent the precipitation of water-free Na$_2$HPO$_4$ or of Na$_2$HPO$_4$ having a smaller content of water of crystallization than the dodecahydrate and to maintain the reversibility of the phase change of Na$_2$HPO$_4$.12H$_2$O for a practically unlimited number of cycles.

Briefly, these objects are achieved with a material produced by adding and mixing into the dodecahydrate a small additional water content from 0,5% up to 5% by weight of the mixture, preferably between 1,0% and 3% by weight, most preferably between 1,5% and 2,5% by weight.

The energy storage medium of the invention may contain, for the reason set forth below, in addition to the additional water, also a small addition of urea. An addition of urea from 0.1 to 2% by weight has been found useful, and preferably an addition of urea between 0.5 and 1.2% by weight. Most preferably, the urea content is about 0.7% by weight.

The invention also provides a method for producing the above-described latent energy storage medium, namely, by mixing disodium hydrogen phosphate dodecahydrate with a small quantity of water and heating the mixture substantially above the melting point—the dodecahydrate may be melted first for mixing if desired—cooling the mixture until crystallization has taken place in a gas-tight container and, if necessary or convenient, remelting the material. As mentioned above, it may be useful to incorporate urea in the material and for that purpose the urea necessary to provide the appropriate urea content of the material may be added to the water to be added to the dodecahydrate or may be added to some other stage of the preparation of the dodecahydrate with an additional water content incorporated therein.

Finally, the invention provides a class of new heat-handling systems for habitable buildings and shelters, including solar heating, heat pump and air-conditioning systems, characterized by the incorporation of a heat storage unit utilizing the above-described latent energy heat storage material.

The latent energy storage medium of the present invention composed of disodium hydrogen phosphate dodecahydrate provided with a small amount of additional water content has outstanding properties, having a melting point of 35° C. lying in a suitable temperature range for habitation of heat control systems and a high latent heat of 403 kJ/dm$^3$ and is particularly distinguished in that its changes of phase remain reversible over a number of cycles that can be as large as desired without requiring the application of any supplementary procedures to maintain or restore the capability of the material.

As mentioned above, the small addition of urea which may desirably be contained in the disodium hydrogen phosphate dodecahydrate material should be in the range between 0.1 and 2% by weight, preferably between 0.5 and 1.2 by weight, and an addition of about 0.7% of urea has been found to be particularly suitable. Large amounts of urea, however, are to be avoided since in such cases the favorable combination of the melting point temperature and the latent heat of phase change that has been noted as that of disodium hydrogen phosphate dodecahydrate is unfavorably shifted and, furthermore, operation as a long-term reversible energy storage medium is no longer provided. Technical-grade materials may be used for composing the latent energy storage medium of the invention. Special precautions or further refining for avoidance of impurities are not necessary.

For production of the energy storage medium of the invention, $Na_2HPO_4.12H_2O$ is mixed with a small amount of water, for which purpose the material is shaken or stirred and the mixture then heated above the melting point, after which it is cooled down to crystallization temperature. Excess water content present, compared to the stoichiometric quantity contained in the dodecahydrate, guarantees that there will always be a sufficient quantity of water available for forming the dodecahydrate, so that no sodium hydrogen phosphate with a smaller amount of water of crystallization, or without any at all, will be precipitated. This is particularly important because $Na_2HPO_4.12H_2O$ gives off water easily in open containers. An additional water content of more than 5% by weight is of no merit since with greater amounts of water the heat capacity of the medium will be sacrificed. It is often necessary in the preparation of the material to raise the mixture once more to a temperature substantially above the melting point of the $Na_2HPO_4.12H_2O$ and then to shake up the mixture and to cool it down to crystallization temperature. The temperature above the melting point of the crystals that is used should not rise above the boiling point of water. It is effective and practical to heat the material in the range of 60°–70° C., preferably 65° C. Thereafter, the mixture so prepared is ready for being provided as the filling of a latent energy storage unit.

According to the particularly preferred embodiment of the invention, the $Na_2HPO_4.12H_2O$ is mixed, along with a small amount of water, additionally with a small amount of urea, and the mixture is further treated with repetition of melting and cooling if necessary or desirable, in the same manner as above described with reference to the addition of water alone. What is essential is that the urea should be well and thoroughly worked into the material.

The latent energy storage material containing water and urea in accordance with the invention has the additional advantage of a smaller expansion coefficient so that the energy storage medium can be handled in containers of any normal container material without any risk of shattering the containing vessels. Both in warehouse and shelf storage and also in operation the latent energy storage medium of the invention should be kept in a manner excluding oxygen and moisture (i.e., in closed vessels).

The latent storage energy medium to the invention is widely applicable and is particularly applicable for solar heating, heat pump heating, and for heat pump heating and cooling system. A particularly suitable field of operation is that of night storage heating. In this case, a latent energy storage medium located, for example, in the floor of a dwelling or office may be melted with cheap nighttime electric power so that thereafter the heat given off upon the crystallization of the material in the storage unit becomes available for heating the overlying space.

The manner of operation of the energy storage system is based upon the supply of external heat (solar heat, earth heat, etc.) to the crystallized material to produce a phase change thereof to the liquid phase (storage process). As needed, this latent energy can be won back by the setting in of the reverse phase change (crystallization). The initiation of crystallization can, for example, be brought about by local cooling, preferably to a temperature less than 25° C. In this manner, the stored latent energy is given off and made available for use until the full crystallization of the energy storage medium has taken place.

The invention is further described with reference to the following illustrative examples:

EXAMPLE I 700 ml of a melt of $Na_2HPO_4.12H_2O$ heated to 60° C. were mixed with 15 ml of water, poured into a vessel, sealed therein gas-tight, and shaken. The mixture was then allowed to cool down with crystallization.

Upon heating up the vessel and its contents with waste heat at a temperature of 40° to 50° C., the contents became liquid and a clear transparent solution was obtained. By local cooling, crystallization was initiated and the contents of the vessel during crystallization gave up its latent heat. Even after multiple repetition of the cycle, no change of behavior resulted.

EXAMPLE II 7 g of urea were dissolved in about 20 ml of water in a 700 ml flask. In a second flask, $Na_2HPO_4.12H_2O$ was melted and heated to about 65° C. The first-mentioned 700 ml flask was then filled with the melt heated to 65° C. in the second flask and the first-mentioned flask was stoppered gas-tight and shaken. The mixture cooled down and crystallized out. The latent heat storage medium was then capable of being installed in a heat storage unit.

When the flask and its content was heated to a temperature of 40° to 45° C. with waste heat, the content became liquid and a clear transparent solution was obtained. Crystallization was then induced by localized cooling and the contents of the flask gave up their latent heat during the resulting crystallization. The heating and cooling was repeated and its was noted that by the 10th repetition no change of behavior had set in.

For purposes of comparison, a flask filled with melted $Na_2HPO_4.12H_2O$ without addition of water or water plus urea was subjected to the same heating and cooling cycles, and already with the second cycle a precipitate appeared which could not be brought into solution on the next warming up, so that a cloudy opaque material was obtained that was no longer useable as a reversible heat storage medium.

Although the invention has been described with reference to specific illustrative examples, it will be understood that modifications and variations are possible within the inventive concept.

We claim:
1. A latent energy storage material of $Na_2HPO_4.12H_2O$ base comprising the improvement that an additional water content of between 0.5% and 5% by weight incorporated therein by mixing enough water with $Na_2HPO_4.12H_2O$, with heating to a temperature substantially above the melting point of $Na_2HPO_4.12H_2O$, and with agitation, to bring the water content additional to the water crystallization to a value between 0.5% and 5% by weight, and
   cooling the mixture in a gas-tight container until recrystallization has taken place.
2. A latent energy storage material as defined in claim 1 in which said additional water content makes up between 1,0% and 3% by weight of the material.
3. A latent energy storage material as defined in claim 1 in which said additional water content makes up between 1,5 and 2,5% of the material.

4. A latent energy storage material as defined in claim 1, 2 or 3 having incorporated therein between 0,1 and 2% by weight of urea.

5. A latent energy storage material as defined in claim 4 in which the urea content is in the range between 0,5 and 1,2% by weight.

6. A method of producing a latent energy storage medium comprising the steps of:

mixing enough water with $Na_2HPO_4.12H_2O$ with heating to a temperature substantially above the melting point of $Na_2HPO_4.12H_2O$, and with agitation, to bring the water content additional to the water of crystallization to a value between 0.5% and 5% by weight, and cooling the mixture in a gas-tight container until recrystallization has taken place.

7. A method as defined in claim 6 in which the water is added in such quantity to bring the water content additional to the water of crystallization to a value between 1% and 3% by weight.

8. A method as defined in claim 6 in which after cooling and recrystallization the said mixture is at least once remelted with agitation.

9. A method as defined in claim 6 in which urea is added during a stage of the mixing step of the method in such quantity as to give the product of the method a urea content between, 0,1 and 2% by weight.

10. A heat transfer system for control of the temperature of enclosed habitable space comprising a heat storage unit containing a heat storage medium as defined in any one of claims 1 and 2 and comprising also means for transferring heat to and from said heat storage unit.

* * * * *